United States Patent
Durrani

[19]

[11] Patent Number: 6,134,986
[45] Date of Patent: *Oct. 24, 2000

[54] STEERING WHEEL ASSEMBLY WITH IMPROVED GEAR

[75] Inventor: Sheryar Durrani, Canton, Mich.

[73] Assignee: Breed Automotive Technology, Inc., Lakeland, Fla.

[ * ] Notice: Under 35 U.S.C. 154(b), the term of this patent shall be extended for 12 days.

[21] Appl. No.: 08/821,738

[22] Filed: Mar. 20, 1997

[51] Int. Cl.[7] ..................................................... B62D 1/10
[52] U.S. Cl. .................................. 74/552; 74/425; 403/8
[58] Field of Search ............................. 74/552, 492, 493, 74/425, 89.14, 432; 280/779; 403/8, 333, 334, 373

[56] References Cited

U.S. PATENT DOCUMENTS

| | | | |
|---|---|---|---|
| 3,430,510 | 3/1969 | Hendrickson | 74/425 |
| 3,862,577 | 1/1975 | Graafsma et al. | 74/432 |
| 4,869,614 | 9/1989 | Fisher | 403/8 |
| 5,144,861 | 9/1992 | Nishijima et al. | 74/552 |
| 5,544,545 | 8/1996 | Sanders et al. | 74/552 |
| 5,588,337 | 12/1996 | Milton | 74/552 |
| 5,692,770 | 12/1997 | Scharboneau et al. | 74/552 X |

*Primary Examiner*—Mary Ann Green
*Attorney, Agent, or Firm*—Carlson, Gaskey & Olds

[57] ABSTRACT

A steering wheel assembly generally comprises a hub having a bore for receiving an outer end of a steering column shaft. A gear is disposed within the upper end of the bore. The gear includes circumferentially spaced teeth extending radially outwardly from an annular collar. The annular collar defines an axial bore having internal threads complementary to threads on an outer end of the steering column shaft. The gear includes an axial inner end, an opposite axial outer end and an axial mid-point. A web-flange tapers radially outwardly from the axial mid-point on the collar toward the inner end.

8 Claims, 3 Drawing Sheets

STEERING WHEEL ASSEMBLY WITH IMPROVED GEAR

BACKGROUND OF THE INVENTION

The present relates to a vehicle steering assembly with an improved gear for retaining a steering wheel assembly on a steering column shaft.

Before the introduction of airbags, steering wheel assemblies could be easily attached to a steering column shaft. Access to the column shaft through a steering wheel assembly was made through the hub of the steering wheel assembly from the front face of the steering wheel assembly.

Airbag assemblies for a driver of a vehicle are typically located on the hub of a steering wheel assembly. Thus, access to a steering column shaft through the hub of a steering wheel assembly has become more difficult. Some methods of attaching a steering wheel and airbag assembly to a steering column shaft require a two step process. A steering wheel assembly is initially attached to a steering column shaft. An airbag assembly is then attached to the steering wheel assembly.

In order to reduce assembly time and labor costs, a modular steering wheel and airbag combination was developed. The modular steering wheel and airbag combination comprises a steering wheel armature and a separate hub plate. An airbag assembly is attached to the hub plate to form a hub plate subassembly. The hub plate subassembly is then attached to a steering wheel assembly including the steering wheel armature.

A structure for securing the steering wheel and airbag combination is accessible from the rear face of the combination. The hub plate is welded or intregal with a hub having a bore into which a steering wheel shaft can be inserted. A gear, preferably a helical gear having a gear portion with angled teeth, is disposed within the bore of the hub. The bore through the hub includes an upper cavity of increased diameter on the rest of the bore, thereby creating a bearing surface upon which the gear rests. The gear also includes threads complementary to threads on an outer end of the steering column shaft. A worm is adapted to drive the helical gear to secure the helical gear to the steering column shaft, thereby retaining the hub to the outer end of the steering column shaft. This structure is described in further detail in copending U.S. application Ser. No. 08/522,627 filed Sept. 1, 1995, the assignee of which is the assignee of the present invention.

To remove the steering wheel assembly, the worm drives the helical gear in the opposite direction, drawing the gear axially away from the steering column shaft. The helical gear assists in forcing the hub plate away from the steering column shaft by impinging on the back of the airbag inflator. During removal, the force required to remove the steering wheel assembly from the steering column shaft can be extremely high, particularly if the steering wheel assembly includes a "wedge lock" between the hub and steering column shaft or if the steering wheel assembly has been assembled on the steering column shaft for many years. This results in equally high torque at the shaft for removal, which current gears and worm tools are unable to provide without significant risk of failure.

SUMMARY OF THE INVENTION

The present invention provides a steering assembly which includes an improved gear for retaining the steering wheel assembly on a steering column shaft.

The steering wheel assembly generally comprises a hub having a bore through which a steering column shaft is inserted. The bore includes an upper cavity of increased diameter relative to the remainder of the bore, thereby forming a bearing surface. A pair of worm bores extend laterally into the hub on either side of the bore.

An improved gear having circumferentially spaced teeth is disposed within the bore and includes threads complementary to threads on an outer end of the steering column shaft. The gear includes a web-flange between the teeth at an inner end of the gear. The web-flange tapers radially outwardly from an axial mid-point toward the inner end of the flange. The inner end and web-flange of the gear rests on the bearing surface of the hub.

A hub cap is removably secured on an outer end of the bore and the hub, thereby retaining the gear within the bore. A hub plate is formed integrally with or secured to the hub. The hub plate is generally concave and provides a structure for mounting an airbag inflator. An airbag inflator is mounted to the hub plate above the bore and hub cap of the hub.

During assembly, the hub plate is secured to the hub and the gear is inserted into the upper end of the bore. The hub cap is then threaded into the outer end of the bore, thereby retaining the gear within the bore. The airbag inflator is then secured to the hub plate above the hub cap and hub. This steering wheel and airbag assembly is then mounted to the steering column shaft. First, the outer threaded end of the steering column shaft is inserted into the bore of the hub until the outer end of the steering column shaft contacts the helical gear. A tool having a worm is then inserted through one of the worm bores laterally into the hub. The worm engages the circumferentially spaced teeth of the helical gear. Rotation of the tool causes rotation of the gear about the axis of the steering column shaft, thereby threadably securing the gear to the outer end of the steering column shaft and retaining the hub on the steering column shaft.

In order to remove the steering wheel assembly from the steering column shaft, the worm tool is again inserted into one of the worm bores such that the worm engages the teeth of the gear. The tool is then rotated in a reverse direction to threadably disengage the gear from the outer end of the steering column shaft.

The web-flange of the gear provides several functions. First, in order to increase the torque strength of the gear, the radial length of the teeth is increased. The web-flange insures that a smooth surface is in contact with the bearing surface of the hub, thereby reducing friction and wear. Further, the web-flange provides increased strength to the gear teeth without interfering with the engagement of the worm and the gear teeth. The web-flange also reduces the stress level at the teeth.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF PREFERRED EMBODIMENT

Figure 1:
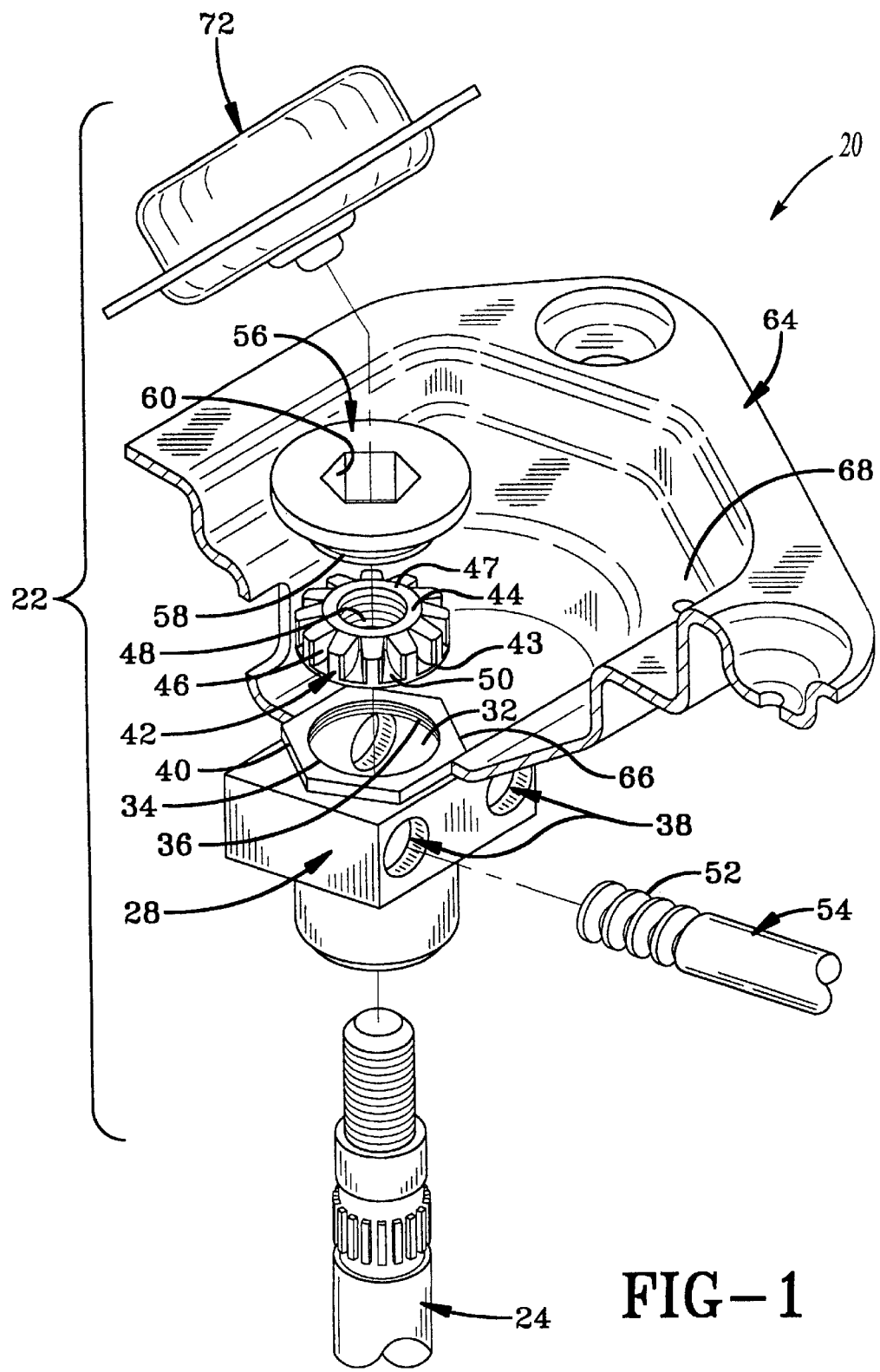
FIG. 1 is a perspective exploded view, partially broken away of the steering wheel assembly of the present invention.

A vehicle steering assembly 20 according to the present invention is shown in FIG. 1. The vehicle steering assembly 20 generally comprises a steering wheel assembly 22 which is secured to a steering column shaft 24 in a manner according to the present invention.

The steering wheel assembly 22 includes a hub 28 having an axial bore 32 for receiving the steering column shaft 24. An axially outer end 34 of the bore 32 includes a set of internal threads 36. The hub 28 further includes a pair of worm bores 38 extending laterally into the hub 28 on either side of the bore 32 and in communication with the bore 32. A hex head 40 is preferably formed at the outer end 34 of the hub 28.

The steering wheel assembly 22 further comprises a gear 42, preferably a gear nut 42 having an axial inner end 43 and an opposite axial outer end 44. The gear nut 42 further preferably includes a plurality of circumferentially spaced teeth 46 extending radially outwardly from an annular collar 47 having an axial bore 48. The gear nut 42 includes a web-flange 50 at the inner end 43. The web-flange 50 tapers radially outwardly generally from a point midway between the inner end 43 and the outer end 44 to the inner end 43. The teeth 46 on the gear nut 42 are complementary to the worm 52 formed on an outer end of a worm tool 54. The preferred gear nut 42 preferably has 12 teeth with a profile known in the gear industry as a "Modified Stub Tooth" profile. This results in a shorter, fatter tooth than a standard tooth profile. In addition, the worm ratio was increased. This is to allow the worm tool to support the greater output load now required at the shaft for pull-off.

A generally annular hub cap 56 preferably includes an externally threaded portion 58 complementary to the threads 36 on the outer end 34 of the bore 32. The hub cap 56 further preferably includes an allen socket 60 or hex head socket or other means for facilitating the threadable engagement of the hub cap 56 to the hub 28 with a tool or otherwise. Further, details of the hub cap 56 are described in copending U.S. application Ser. No. 08/827,281, filed Mar. 18, 1997, the Assignee of which is the Assignee of the present invention.

A generally concave hub plate 64 includes a lower hexagon orifice 66 complementary to the hex head 40 on the outer end 44 of the hub 28. The hub plate 64 includes a surface 68 to which an airbag inflator assembly can be secured. The steering wheel assembly 22 includes an airbag inflator 72 to be mounted to the hub plate 64.

During assembly, the hub plate 64 is preferably spot welded to the hub 28 with the hex head 40 of the hub 28 disposed within the complementary orifice 66 of the hub plate 64 to further prevent relative rotation. The gear nut 42 is inserted into the bore 32 of the hub 28. The hub cap 56 is then threaded onto the outer end 34 of the hub 28, thereby retaining the gear nut 42 within the bore 32. The airbag inflator 72 is then secured to the hub plate 64 such as by bolting the airbag inflator 72 to the surface 68.

This steering wheel assembly 22 is then secured to the steering shaft 24. First, the steering shaft 24 is inserted into the bore 32 of the hub 28. The worm tool 54 is then inserted into one of the worm bores 38, such that the worm 52 engages the teeth 46 on the gear nut 42. Rotation of the worm tool 54 causes rotation of the gear nut 42 about the axis of the steering column shaft 24 thereby securing the gear nut 42 and the hub 28 onto the outer end 26 of the steering shaft 24.

Figure 2:
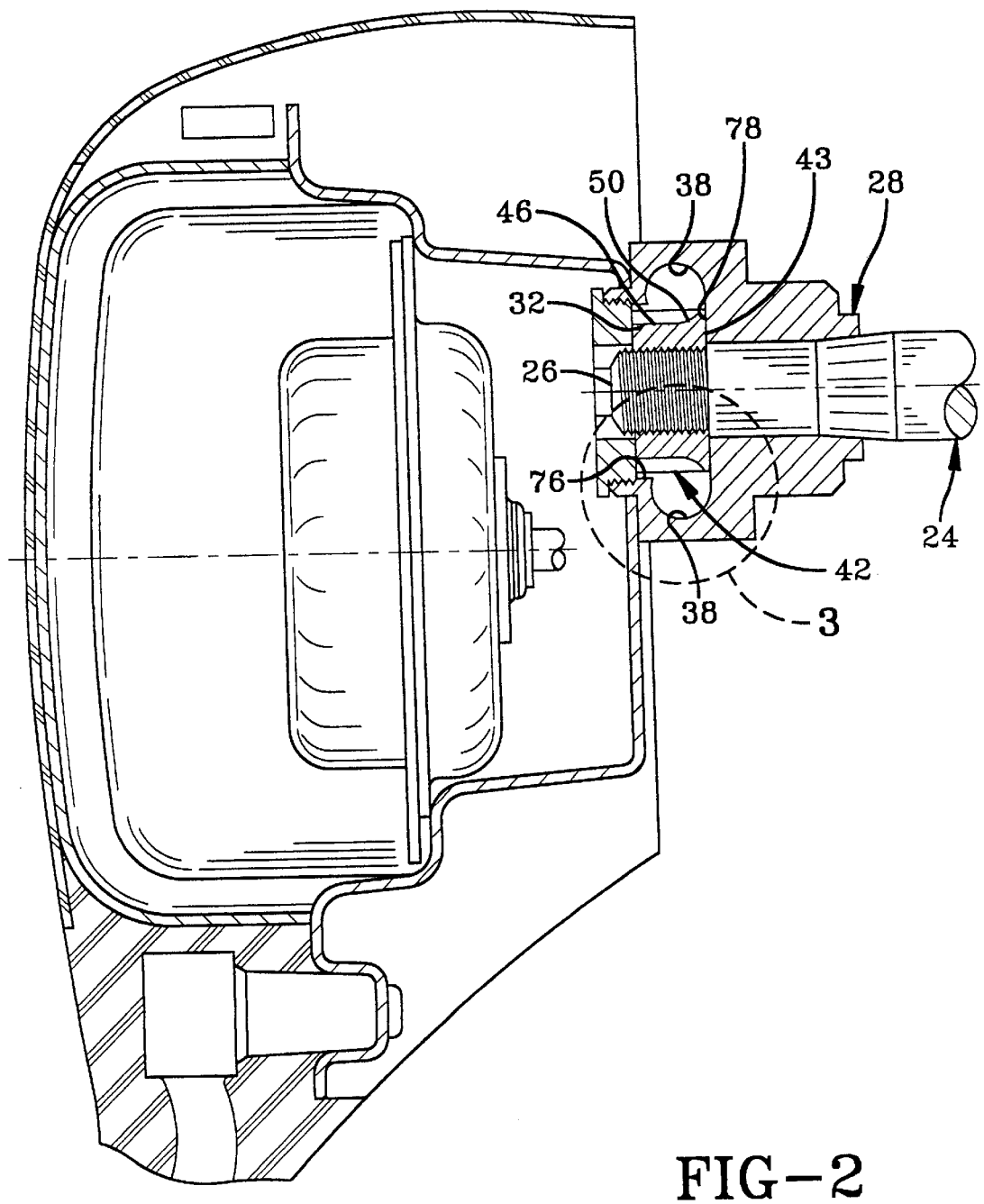
FIG. 2 is a sectional view of an assembled steering wheel assembly of FIG. 1.

The assembled vehicle steering assembly 20 is shown in FIG. 2. The gear nut 42 is threadably secured to the outer end 26 of the steering shaft 24 within the bore 32 of the hub 28. The gear nut 42 is disposed within an upper cavity 76 of the bore 32 in the hub 28. The upper cavity preferably has an increased diameter relative to the remainder of the bore 32, thereby creating a bearing surface 78 upon which the gear nut 42 rests. As can be seen in FIG. 2, the web-flange 50 of the gear nut 42 provides an increased smooth surface at the inner end 43 of the gear nut 42 in contact with the bearing surface 78 of the hub 28, thereby reducing friction which otherwise could be caused by the teeth 46 grinding against the bearing surface 78.

As can be further seen in FIG. 2, the worm bores 38 are preferably disposed on either side of the bore 32 in the hub 28. The worm bores 38 are preferably generally circular in cross section with a portion of the upper cavity 76 intersecting the cross section of the worm bores 38 such that the worm 52 on the worm tool 54 will engage the teeth 46 on the gear nut 42.

Figure 3:
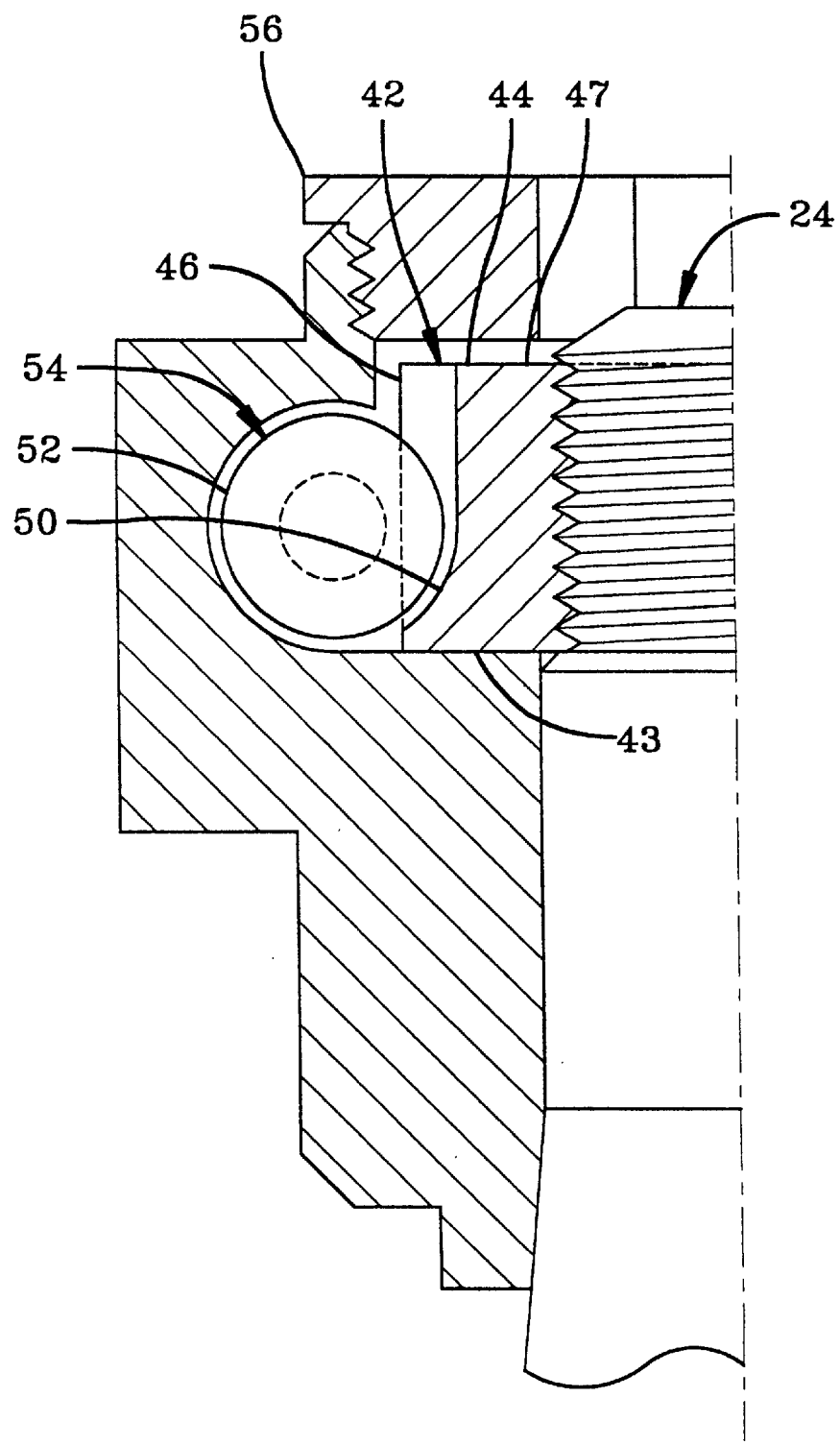
FIG. 3 is an enlarged view of the gear and worm in area 3 of FIG. 2.

As can be seen in FIG. 3, the web-flange 50 tapers radially outwardly from the collar 47 toward the inner end 43. The web-flange 50 generally tapers radially outwardly from a mid-point between the inner end 43 and outer end 44 of the gear nut 42. In this manner, the web-flange 50 provides increased strength to the teeth 46 as well as reducing the stress level on the teeth 46 without interfering with the engagement of the worm 52 with the teeth 46. The addition of the web-flange 50 has been determined to reduce the stress level at the teeth 46.

It should be recognized that the gear nut 42 could be alternatively provided with a shaft having external threads and extending downwardly into an internally threaded socket of the steering column shaft. Such an arrangement is disclosed in copending U.S. application Ser. No. 08/522,627 filed Sept. 1, 1995, the assignee of which is the assignee of the present invention.

During removal of the steering wheel assembly 22 from the steering column shaft 24 the worm tool 54 is again inserted into one of the worm bores 38, such that the worm 52 engages the teeth 46 of the gear nut 42. The worm tool 54 is then rotated in an opposite direction causing the gear nut 42 to threadably disengage the steering column shaft 24. During removal, the gear nut 42 impinges upon the hub cap 56 which directly transmits force to the hub 28 and places no stress upon the airbag inflator 72 or any of the connection points between the airbag inflator 72 and the hub plate 64 or between the hub plate 64 and the hub 28. Rotation of the gear nut 42 during removal forces the steering column shaft 24 downwardly away from the steering wheel assembly 22, thereby assisting in its removal.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A steering wheel assembly comprising:
   a steering shaft having a threaded outer end;
   a hub mounted on said outer end of said steering shaft, said hub including a bore for receiving said outer end of said steering shaft, said bore having a bearing surface;
   a gear within said bore of said hub on said bearing surface, said gear having circumferentially spaced teeth extending radially outwardly from an annular collar, said gear further including threads complementary to said threaded outer end of said steering shaft, said gear having an axial end, said gear further including a web-flange extending radially outwardly from said collar, said web-flange extending circumferentially between said teeth, said web-flange tapered radially outwardly moving axially toward said axial end.

2. The steering wheel assembly of claim 1 wherein said axial end is an axial inner end.

3. The steering wheel assembly of claim 1 wherein said gear is a gearnut including an axial bore, said threads formed on an inner surface of said bore, said outer end of said steering shaft having external threads complementary to said threads on said inner surface of said bore.

4. The steering wheel assembly of claim 2 wherein said gear includes a mid-point equidistant from said inner end and an outer end, said web-flange tapering radially outwardly from said mid-point to said inner end.

5. A steering wheel assembly comprising:
a hub including a bore for receiving an outer end of a steering shaft, said bore including a bearing surface;
a gear within said bore of said hub, said gear having circumferentially spaced teeth extending radially outwardly from an annular collar, said gear having opposite axial inner and outer ends, said gear further including a web-flange extending radially outwardly from said collar, said web-flange extending circumferentially between said teeth, said web-flange tapered radially outwardly moving axially toward said inner end.

6. The steering wheel assembly of claim 5 wherein said gear is a gearnut including an axial bore having threads formed on an inner surface of said bore.

7. The steering wheel assembly of claim 5 wherein said gear includes a mid-point equidistant from said inner end and said outer end, said web-flange tapering radially outwardly from said mid-point to said inner end.

8. The steering wheel assembly of claim 5 wherein said bore of said hub includes an upper cavity of increased diameter, said upper cavity defined by said bearing surface adjacent the remainder of said bore, said gear disposed within said upper cavity.

* * * * *